United States Patent
Hutten et al.

(10) Patent No.: US 11,151,795 B2
(45) Date of Patent: Oct. 19, 2021

(54) SYSTEMS AND METHODS OF CREATING VIRTUAL POP-UP SPACES

(71) Applicant: Wormhole Labs, Inc., Huntington Beach, CA (US)

(72) Inventors: Curtis Hutten, Laguna Beach, CA (US); Robert D. Fish, Irvine, CA (US); Brian Kim, Walnut, CA (US)

(73) Assignee: Wormhole Labs, Inc., North Hollywood, CA (US)

( * ) Notice: Subject to any disclaimer, the term of this patent is extended or adjusted under 35 U.S.C. 154(b) by 0 days.

(21) Appl. No.: 16/709,791

(22) Filed: Dec. 10, 2019

(65) Prior Publication Data

US 2021/0174591 A1 Jun. 10, 2021

(51) Int. Cl.
*G06T 19/00* (2011.01)
*G06Q 30/06* (2012.01)

(52) U.S. Cl.
CPC ....... *G06T 19/006* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 6,726,567 B1 | 4/2004 | Khosla | |
| 9,595,136 B2 * | 3/2017 | Shuster | ............... G06F 3/04815 |
| 9,679,417 B1 | 6/2017 | Ross | |
| 10,068,374 B2 * | 9/2018 | Miller | ..................... G06K 9/38 |
| 10,482,664 B1 | 11/2019 | Schlosser et al. | |
| 2010/0131947 A1 | 5/2010 | Ackley et al. | |
| 2013/0009994 A1 * | 1/2013 | Hill | ........................ G06N 3/006 345/633 |
| 2013/0044129 A1 * | 2/2013 | Latta | ....................... G06F 3/011 345/633 |
| 2014/0052550 A1 | 2/2014 | Glazer et al. | |
| 2016/0048908 A1 * | 2/2016 | Sibai | .................. G06Q 30/0643 705/14.1 |
| 2016/0300387 A1 | 10/2016 | Ziman | |
| 2018/0342106 A1 * | 11/2018 | Rosado | ................... A63F 13/86 |
| 2019/0073830 A1 * | 3/2019 | Fujimoto | ......... H04N 21/21805 |
| 2019/0108686 A1 | 4/2019 | Spivack et al. | |
| 2020/0051336 A1 * | 2/2020 | Ichikawa | ............... G06F 3/011 |

OTHER PUBLICATIONS

International search report dated Apr. 2, 2021, for related PCT application No. PCT/US2020/064354. 13 pages.

* cited by examiner

*Primary Examiner* — Edward Martello

(74) *Attorney, Agent, or Firm* — Fish IP Law, LLP

(57) ABSTRACT

A computer-implemented virtual pop-up space comprises a traversable 3D representation of a real-world location, wherein the traversable 3D representation renders a first avatar of a first user. The inventive concept further provides a virtual interface configured to enable a user transaction through the first avatar within the traversable 3D representation of the real-world location.

17 Claims, 7 Drawing Sheets

SYSTEMS AND METHODS OF CREATING VIRTUAL POP-UP SPACES

FIELD OF THE INVENTION

The field of the invention is mixed reality environments.

BACKGROUND

For many practical reasons, social media is relied upon as a way of quickly connecting with others without the inconveniences of physically traveling to the person. Although social networking connects people on many levels, social media users often feel increasingly isolated. One reason for this feeling of isolation is because of the lack of close physical interactions between linked social media users. The inventive concepts herein aim to integrate combinations of augmented reality spaces, interactive objects, and virtual reality spaces in a manner that increases the feeling of connectedness between users.

Specifically, the present invention enables individuals to dynamically create and update shared augmented reality spaces by combining spatial data captures, such as by imaging or other volumetric mapping techniques, from multiple users to stitch together a larger shared virtual space. By allowing individuals to build virtual reality, augmented reality, and mixed realities in a crowd-sourced fashion, the present invention contemplates the creation of a dynamically updated virtual environment populated by avatars. Further, these shared virtual spaces can mimic and augment real-life interactions and transactions. For example, the contemplated shared virtual spaces allow a digital storefront to be a near-real time representation of the physical store and allowing the purchase of goods and services both present and not present in the physical store.

US Patent Application No. 2010/0131947 to Ackley teaches a multi-user experience using both a local user and a remote user. Ackley, however, fails to disclose a system and method that allows users to build their environment in substantially real-time, and occupy that space with a community of other avatars/users in a merged space.

U.S. Pat. No. 6,726,567 to Khosla teaches a simulated real-time live event that allows the users to play along with the live event. As with Ackley, Khosla fails to disclose an augmented reality and virtual reality hybrid system that allows participants to socialize and engage with each other in gameplay in both augmented reality and virtual reality sub-spaces. Khosla also fails to describe a linked mixed reality system that is contemplated by the presented invention.

In conventional mapping systems, it is generally known that virtual representations of the map can be periodically updated. However, the periodicity of updates in mapping systems are a result of the limitations of current technology. Mapping services, such as Google Maps and Apple Maps, hire designated individuals to map their surroundings in a controlled manner, which does not enable maps to be updated in substantially real-time and stitched together from crowd-sourced environment data. Unlike such conventional systems and methods, the inventive concepts herein contemplate receiving environment data from one or more individuals, at any given time, to create a living and breathing virtual representation of real geographic locations' i.e., "pop-up spaces". The inventive concepts herein further contemplate the use of living and breathing virtual representations of real-world environments in a manner that enables commerce and other transactions between or among any entities therein. It is further contemplated that a system could request particular environment data from particular users to use in implementing transactional or other aspects of such pop-up spaces. Optionally, users can be compensated with money or other incentives. Accordingly, the inventive concepts herein allow for significantly more detail and relevancy in virtual representations of real-world locations by mapping on a highly granular level in a targeted manner.

Ackley, Khosla, and all other extrinsic materials discussed herein are incorporated by reference to the same extent as if each individual extrinsic material was specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for systems and methods of stitching together crowd-sourced environment data to create highly detailed and customizable virtual representations of real-world environments.

SUMMARY OF THE INVENTION

The inventive concepts herein contemplate virtual reality, augmented reality, and/or mixed reality environments that are highly customizable with various interactive elements. In preferred embodiments, the interactive elements can be at least partially built by users of the mixed reality space.

In the prior art, mixed reality spaces are typically curated experiences with substantially static content. Mixed reality spaces that reflect real-world locations with substantially real-time data can allow for a highly augmented experience for both purely virtual users and for real-world users. Further, merging of augmented reality worlds and virtual worlds allows for a significantly greater diversity in number of transactions between participating users. For example, both real goods and digital goods can be sold and traded. Additionally, interactive elements included in mixed reality spaces can allow for additional functionality for users in both real-world and virtual spaces.

The inventive concepts herein further contemplate controlling the influx and efflux of participants in any given mixed reality space. To accommodate this eventuality, authentication measures can be used, for example, to prevent additional or particular users from entering a merged virtual space based on the characteristics of the individuals and the space.

Various resources, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the following description is drawn to various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including allowing users to access mixed reality environments. Mixed reality environments can include any combination of virtual and augmented reality environments and can be connected to each other in any manner.

For the purposes of this application, sub-environments can comprise any one or more of an augmented reality, a virtual reality, and any other interactive media format. For example, a primary sub-environment can be a first augmented reality, and a secondary sub-environment can be a second augmented reality connected to the first through a portal.

As used herein, volumetric representations can be any rendered environment. In preferred embodiments, volumetric representations are "pop-up space" accessible by remote users.

For the purposes of this application, "portal" or any similar terms, such as "portalling" and "portalled" mean any connections between or among environments. Portals can be in the form of interactive objects, designated spaces, or any other form that allows a user to connect to other augmented realities and/or virtual realities.

Figure 1:
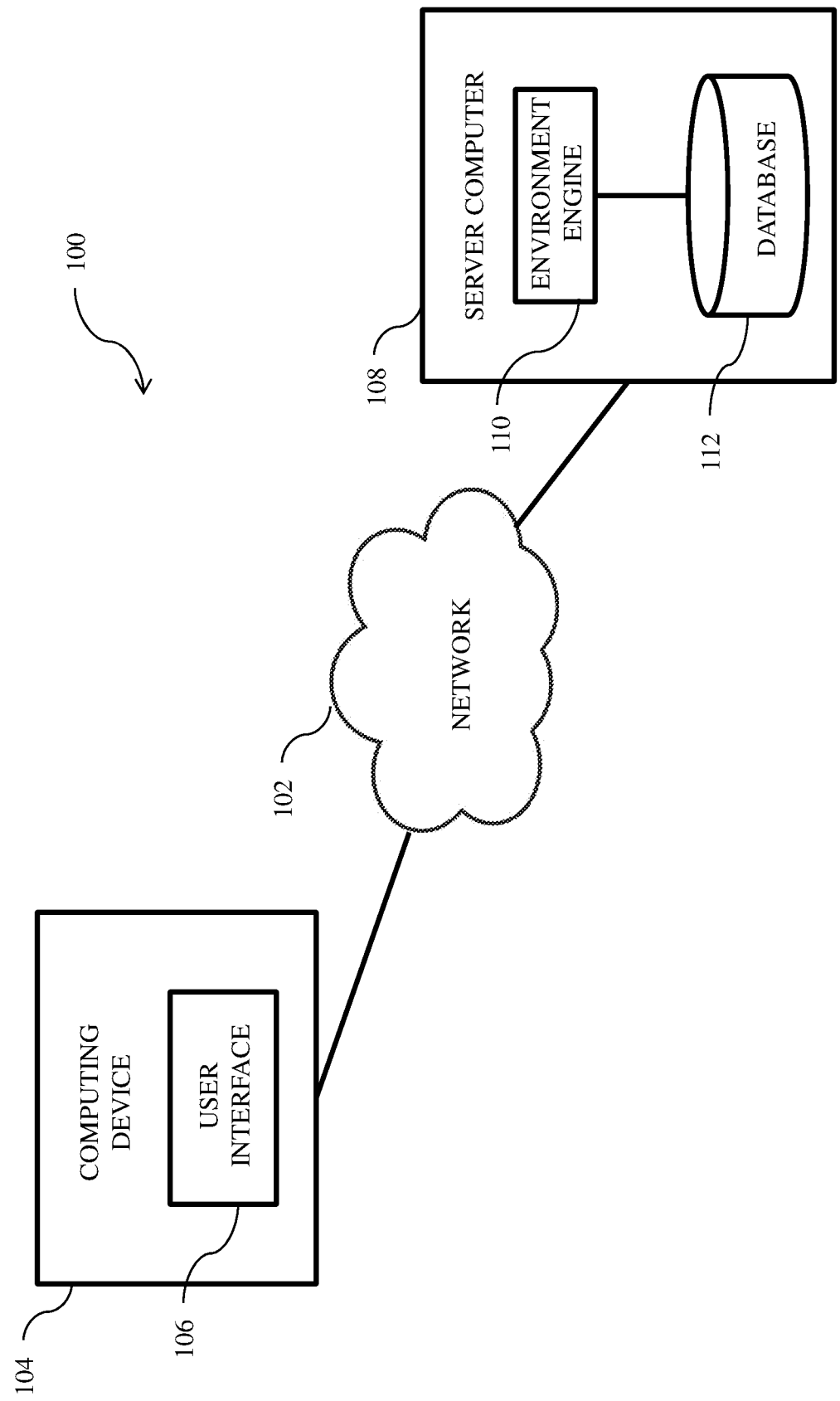
FIG. 1 is a functional block diagram illustrating a distributed data processing environment.

FIG. 1 is a functional block diagram illustrating a distributed data processing environment.

The term "distributed" as used herein describes a computer system that includes multiple, physically distinct devices that operate together as a single computer system. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 104 and server computer 108, interconnected over network 102. Network 102 can include, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 104, server computer 108, and any other computing devices (not shown) within distributed data processing environment 100.

It is contemplated that computing device 104 can be any programmable electronic computing device capable of communicating with various components and devices within distributed data processing environment 100, via network 102. It is further contemplated that computing device 104 can execute machine readable program instructions and communicate with any devices capable of communication wirelessly and/or through a wired connection. Computing device 104 includes an instance of user interface 106.

User interface 106 provides a user interface to environment engine 110. Preferably, user interface 106 comprises a graphical user interface (GUI) or a web user interface (WUI) that can display one or more of text, documents, web browser windows, user option, application interfaces, and operational instructions. It is also contemplated that user interface can include information, such as, for example, graphics, texts, and sounds that a program presents to a user and the control sequences that allow a user to control a program.

In some embodiments, user interface can be mobile application software. Mobile application software, or an "app," is a computer program designed to run on smart phones, tablet computers, and any other mobile devices.

User interface 106 can allow a user to register with and configure environment engine 110 (discussed in more detail below) to enable a user to access a mixed reality space. It is contemplated that user interface 106 can allow a user to provide any information to environment engine 110.

Server computer 108 can be a standalone computing device, a management server, a web server, a mobile computing device, or any other computing system capable of receiving, sending, and processing data.

It is contemplated that server computer 108 can include a server computing system that utilizes multiple computers as a server system, such as, for example, a cloud computing system.

In other embodiments, server computer 108 can be a computer system utilizing clustered computers and components that act as a single pool of seamless resources when accessed within distributed data processing environment 100.

Database 112 is a repository for data used by environment engine 110. In the depicted embodiment, environment engine 110 resides on server computer 108. However, database 112 can reside anywhere within a distributed data processing environment provided that environment engine 110 has access to database 112.

Data storage can be implemented with any type of data storage device capable of storing data and configuration files that can be accessed and utilized by server computer 108. Data storage devices can include, but are not limited to, database servers, hard disk drives, flash memory, and any combination thereof.

Figure 2:
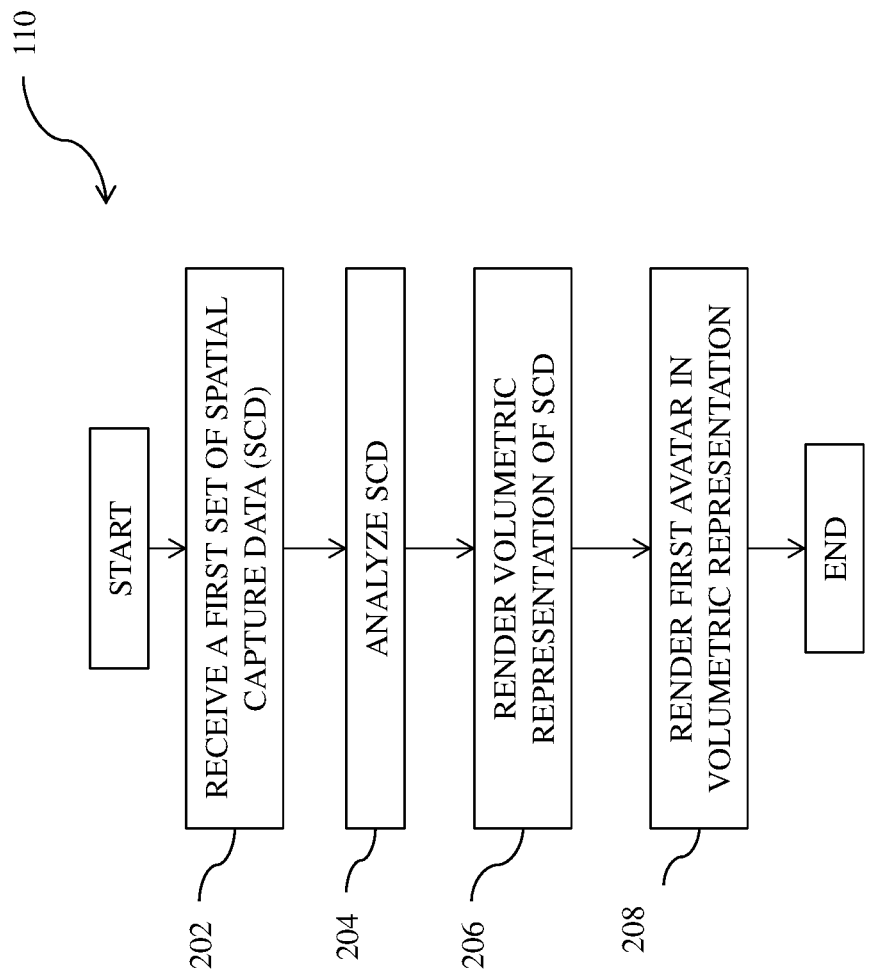
FIG. 2 is a schematic of a method of managing spatial capture data received from a first user to create a traversable walkabout reality.

FIG. 2 is a schematic of a method of managing spatial capture data received from a first user to create a traversable walkabout reality.

Environment engine 110 receives a first set of spatial capture data (step 202).

Spatial capture data can comprise any data that is used to create a volumetric representation of a physical space. Spatial capture data can include any type of sensor used to capture a surrounding environment.

In one embodiment, spatial capture data uses optical sensors to capture an image of the environment. It is contemplated that any one or more analytical techniques can be applied to the images to construct a volumetric representation of the environment. For example, spatial capture data can use an object recognition technique to determine the content of the picture and apply the appropriate volumetric translation into the volumetric representation.

In another embodiment, spatial capture data uses reflection-based imaging. For example, spatial capture data can use light detection and ranging (LIDAR) systems to create a high resolution image of the surrounding environment. However, reflection-based imaging is not limited to LIDAR and any reflection-based system is contemplated herein.

In yet another embodiment, spatial capture data uses radio wave detection systems. For example, spatial capture data can use radar technology to determine the relative distance between the source of the radio wave and the detected object.

A virtual environment can include virtual elements and augmented reality elements. Augmented reality elements are derived from physical spaces in the real world. In preferred embodiments, the virtual environment comprises both virtual elements and augmented reality elements presented in the virtual environment. For example, the virtual environment can be a three-dimensional representation of the Earth where augmented reality elements are distributed within the three-dimensional representation of the Earth. In a more specific example, the augmented reality elements can be tied to specific individuals and contain representations of the individuals' real-world environments by any means known in the art, including 360° cameras, conventional video cameras, and stitched photos from cameras.

Environment engine 110 analyzes the spatial capture data (step 204).

Environment engine 110 can use any analytical techniques to analyze the spatial capture data. In one embodiment, environment engine 110 uses object recognition techniques. For example, environment engine 110 can recognize particular objects and their relative scales within a scene to construct an environment associated with the spatial capture data. In another example, environment engine 110 can analyze the movement of objects in a scene relative to each other to construct an environment associated with the spatial capture data.

In another embodiment, environment engine 110 uses any one or more machine learning techniques to analyze the spatial capture data and construct a respective environment.

Using a descriptive analytical framework, environment engine 110 can analyze the data to quantitatively describe the main trends in a collection of data. For example, environment engine 110 can analyze spatial capture data to determine trends and patterns in the surrounding environment and use the resulting analysis to assist in constructing interactive augmented reality, virtual reality, and/or mixed reality spaces.

Using an exploratory analytical framework, environment engine 110 can analyze spatial capture data sets to find previously unknown relationships. For example, environment engine 110 can use one or more algorithms, including, for example, machine learning algorithms such as time-series forecasting, supervised learning classifiers, and linear regression analyses, to determine a connection between two seemingly unrelated user data points (e.g., finding a connection between a predominantly red and yellow color scheme in a real-world location and a higher probability of the space being a restaurant and using that spatial capture data to categorize different captured spaces).

Using an inferential analytical framework, environment engine 110 can analyze a representative subgroup of data sets to make inferences about a bigger population. For example, environment engine 110 can analyze multiple data capture sets within a one-mile threshold in an area of the United States and identify a significant amount of visual cues associated with Chinese language and culture. Based on this analysis, environment engine 110 can infer that the area is likely has a higher likelihood of Chinese people populating the real-world location.

Using a predictive analytical framework, environment engine 110 can analyze current and historical data to make predictions about future events. Predictive analytical frameworks can include the use of supervised learning classifiers, time-series forecasting, and any other machine-learning algorithms.

In one example, environment engine 110 can review the spatial capture data submitted by different users over a two-year period of time. Based on the analysis, environment engine 110 can predict at what time of year particular changes to the physical environment will likely occur based on seasonal patterns.

It is contemplated that using supervised learning classifiers allows environment engine 110 to make inferences from the data based on what is taught by the training data in order to analyze unexpected situations in a more reasonable way (e.g., come to conclusions that a human being might come to). Training data can include data that is collected by environment engine 110 and data that is directly inputted by a user.

Using a causal analytical framework, environment engine 110 can adjust one variable in a real or hypothetical situation to determine how it affects another variable. For example, environment engine 110 can determine how increasing the inclusion of interactive virtual objects within a volumetric representation of a real store positively or negatively affects the sale of real items displayed therein (e.g., whether the inclusion of rendered virtual goods for sale in an augmented reality context). It is contemplated that the causal analysis in the preceding example can help determine how third parties in the user's augmented reality space make purchasing decisions.

In some embodiments, environment engine 110 can use a mechanistic analytical framework, which is used to understand the exact effects of how changing a variable leads to changes in other variables for one or more entities in an environment.

It is contemplated that environment engine 110 can use any combination of the preceding analytical techniques. It is further contemplated that environmental engine 110 can use any analytical technique known in the art.

Environment engine 110 renders a volumetric representation based on the analysis of the spatial capture data (step 206)

It is contemplated that the volumetric representation can be any representations that occupies a virtual three-dimensional space when rendered. For example, the volumetric representation can be rendered in virtual reality, mixed reality, augmented reality, and any combination thereof.

In some embodiments, the volumetric representation can be a panoramic photo taken around a user and stitched together to create a cylindrical render around the user. In other embodiments, the volumetric representation can include three dimensional rendered objects in the volumetric representation. For example, the volumetric representation can include rendered models of a car, a house, and a tree in the user's surrounding, which can be captured via imaging techniques such as LIDAR and radar.

Environment engine 110 renders a first avatar in the rendered volumetric representation. (step 208).

Environment engine 110 can render any avatar associated with a user. In some embodiments, avatars can be selected by a user. For example, environment engine 110 can retrieve information inputted by a user regarding a saved avatar profile.

In other embodiment, environment engine 110 can assign avatars based on any one or more parameters. For example, environment engine 110 can assign avatars in a gaming convention based on the sponsored character models supplied by the event sponsors. In a related example, environment engine 110 change each avatar back to their default appearance once a user leaves the geofence defining the boundaries of the gaming convention.

In yet another embodiment, environment engine 110 can use machine learning techniques to automatically render an avatar. For example, environment engine 110 can analyze a user's social media profile and photographs therein to construct an avatar reflecting the clothing and the physical appearance of the user. In another example, environment engine 110 can change a user's avatar automatically based on environmental parameters, such as changing an avatar's outfit from shorts and shirt to pants and a coat based on the darkening of the sky and the recorded temperature in the real-world location.

Figure 3:
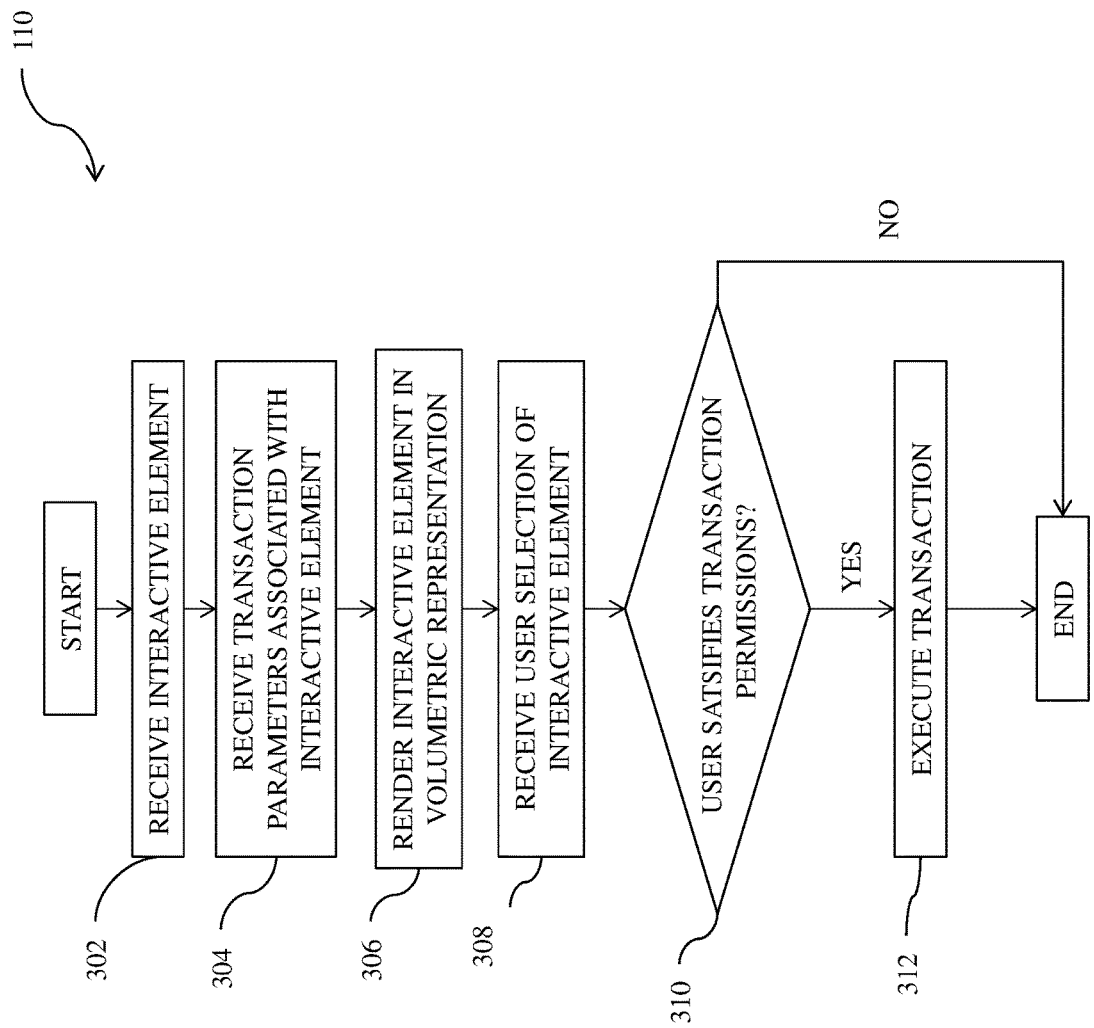
FIG. 3 is a schematic of a method of integrating interactive elements and executing user transactions associated with the interactive elements.

FIG. 3 is a schematic of a method of integrating interactive elements and executing user transactions associated with the interactive elements.

Environment engine 110 receives an interactive element (step 302).

An interactive element can be any element that causes a secondary action to occur. In one embodiment, the interactive element can lead to another augmented reality environment. For example, an avatar within a volumetric representation of a desert music concert can access a separate virtual environment by activating a portal in the volumetric representation. It is contemplated that any virtual environments visited through a portal can be traversed by visiting users.

In yet other embodiments, the interactive element can be an object in a volumetric representation that executes an action when activated. For example, the interactive element can be an avatar customization item displayed as a virtual object in a render of a real-world store front.

In another example, the interactive element can be a virtual button that opens up and allows the user to select one or more additional interactive objects to execute a transaction.

In yet another example, the interactive element can be a second avatar, wherein selecting the second avatar allows a first avatar to engage in any one or more interactions/transactions (e.g., trading of digital goods/service, purchase/sale of good/service, exchanging of messages, etc.).

Environment engine 110 receives one or more transaction parameters associated with the interactive element (step 304).

In one embodiment, the transaction parameters are associated with a sale. For example, environment engine 110 can receive rules associated with the purchase a digital good, such as music or avatar skins. When a user selects an interactive element associated with a sale, environment engine 110 can use the transaction parameters to manage the execution of the sale. For example, environment engine 110 can receive transaction parameters requiring that a user attempting to purchase the item is older than 13 years old and is using a credit card tied to the user's own name.

In another embodiment, the transaction parameters can be associated with an exchange. For example, environment engine 110 can receive rules governing the interactions between avatars, such as messaging, exchange of goods, and exchange of services. In a more specific related example, environment engine 110 can receive rules that require that both parties must directly message each other and select a confirmation button to confirm a trade to execute and exchange of a digital avatar skin.

In another embodiment, environment engine 110 can receive rules governing the interactions between a user avatar and an in-environment non-user character. For example, environment engine 110 can require that users confirm a spot in a queue to purchase an exclusive item in limited supply. In another example, environment engine 110 can require that users direct their avatars to talk to a virtual doorman to be let into an exclusive virtual walkabout reality.

However, it is contemplated that transaction parameters can include any variable associated with managing the interaction between two entities in any space comprising virtual elements.

Environment engine 110 renders the interactive element in the volumetric representation (step 306).

It is contemplated that the interactive element can be rendered in any manner known in the art. For example, the interactive element can be a virtual render of a product that floats in an area of a store front. In another example, the interactive element can be in the form of a rendered non-player character in the volumetric representation of a real-world environment. In yet another example, the interactive element can be a virtual geofence that automatically activates a secondary action when broken.

However, the preceding examples are merely illustrative, and the interactive element can be any element that triggers a secondary action within a virtual walkabout reality.

Environment engine 110 receives a user selection of an interactive element (step 308).

As discussed in step 306, the user can select the interactive element in any manner that triggers a secondary action.

Environment engine 110 determines whether the user satisfies the transaction parameters (decision block 310).

As discussed above, environment engine 110 can look any type of data associated with a user and determine whether the user satisfied the transaction parameters.

For example, environment engine 110 can prohibit users from purchasing or conducting any other transactions based on age, in-world permissions, and minimum financial requirements. In another example, environment engine 110 can require users to meet a certain number of requirements, such as a minimum level in a particular video game, to enter into an exclusive space.

However, it is contemplated that environment engine 110 can manage transactions in any manner known in the art using any transaction parameters.

Responsive to determining that the user does not satisfy the transaction permissions, environment engine 110 ends ("NO" branch, decision block 310).

Responsive to determining that the user does satisfy the transaction permissions ("YES" branch, decision block 310), environment engine 110 executes the transaction (step 312).

Figure 4:
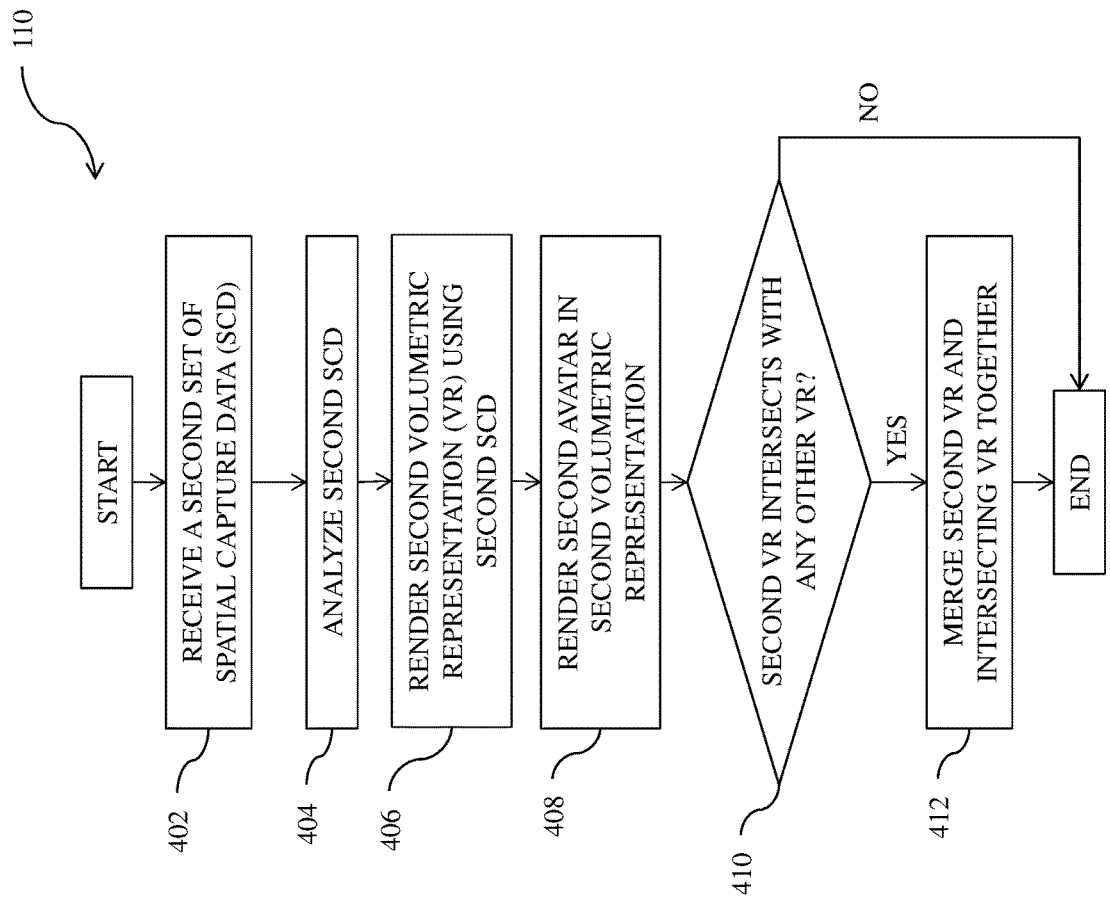
FIG. 4 is a schematic of a method of executing a user transaction in a merged virtual representation about at least two avatars associated with first and second users, respectively.

FIG. 4 is a schematic of a method of executing a user transaction in a merged virtual representation about at least two avatars associated with first and second users, respectively.

Environment engine 110 receives a second set of spatial capture data (step 402).

As discussed above in step 202, spatial capture data can comprise any data that is used to create a volumetric representation of a physical space. Spatial capture data can include any type of sensor used to capture a surrounding environment.

In one embodiment, spatial capture data uses optical sensors to capture an image of the environment. It is contemplated that any one or more analytical techniques can be applied to the images to construct a volumetric representation of the environment. For example, spatial capture data can use an object recognition technique to determine the content of the picture and apply the appropriate volumetric translation into the volumetric representation.

In another embodiment, spatial capture data uses reflection-based imaging. For example, spatial capture data can use light detection and ranging (LIDAR) systems to create a high-resolution image of the surrounding environment. However, reflection-based imaging is not limited to LIDAR and any reflection-based system is contemplated herein.

In yet another embodiment, spatial capture data uses radio wave detection systems. For example, spatial capture data can use radar technology to determine the relative distance between the source of the radio wave and the detected object.

A virtual environment can include virtual elements and augmented reality elements. Augmented reality elements are derived from physical spaces in the real world. In preferred embodiments, the virtual environment comprises both virtual elements and augmented reality elements presented in the virtual environment. For example, the virtual environment can be a three-dimensional representation of the Earth where augmented reality elements are distributed within the three-dimensional representation of the Earth. In a more specific example, the augmented reality elements can be tied to specific individuals and contain representations of the individuals' real-world environments by any means known in the art, including 360° cameras, conventional video cameras, and stitched photos from cameras.

Environment engine 110 analyzes the second set of spatial capture data (step 404).

As discussed in step 204, environment engine 110 can analyze spatial capture data using any analytical techniques known in the art, including, for example, machine learning algorithms.

Environment engine 110 renders a second volumetric representation using the second set of spatial capture data (step 406).

As discussed in step 206, environment engine 110 can render any type of volumetric representation of the second set of spatial capture data.

Environment engine 110 renders a second avatar in the second volumetric representation (step 408).

As discussed in step 208, environment engine 110 can render the avatar in the second volumetric representation in any manner known in the art.

The embodiments and examples herein also contemplate interactivity between users in the same space. However, not all spaces are contemplated to allow users to interact with each other. For example, a space as small as a bedroom with 1000 users inside will not practically be able to simultaneously have 1000 avatars associated with the users within.

Environment engine 110 determines whether the second volumetric representation intersects with any other volumetric representation (decision block 410).

An intersection can constitute any shared spatial area, including at least, for example, a line shared between two adjacent cylindrical volumetric representations. In volumetric representations of an irregular shape, the intersection can be at least one shared point in the spaces defined by the spatial capture data. For example, the intersection of two sets of spatial capture data using LIDAR technology can be a single shared point.

Responsive to determining that the second volumetric representation intersects with another volumetric representation ("YES" branch, decision block 410), environment engine 110 merges the second volumetric representation and an intersecting volumetric representation together (step 412).

Environment engine 110 merges the two volumetric representations together in any manner known in the art. In some embodiments, environment engine 110 can use a mixture of image manipulation techniques to stitch together a walkabout reality populated by real-world users by proxy of their respective avatars.

Responsive to determining that the second volumetric representation does not intersect with another volumetric representation ("NO" branch, decision block 410), environment engine 110 ends.

Figure 5:
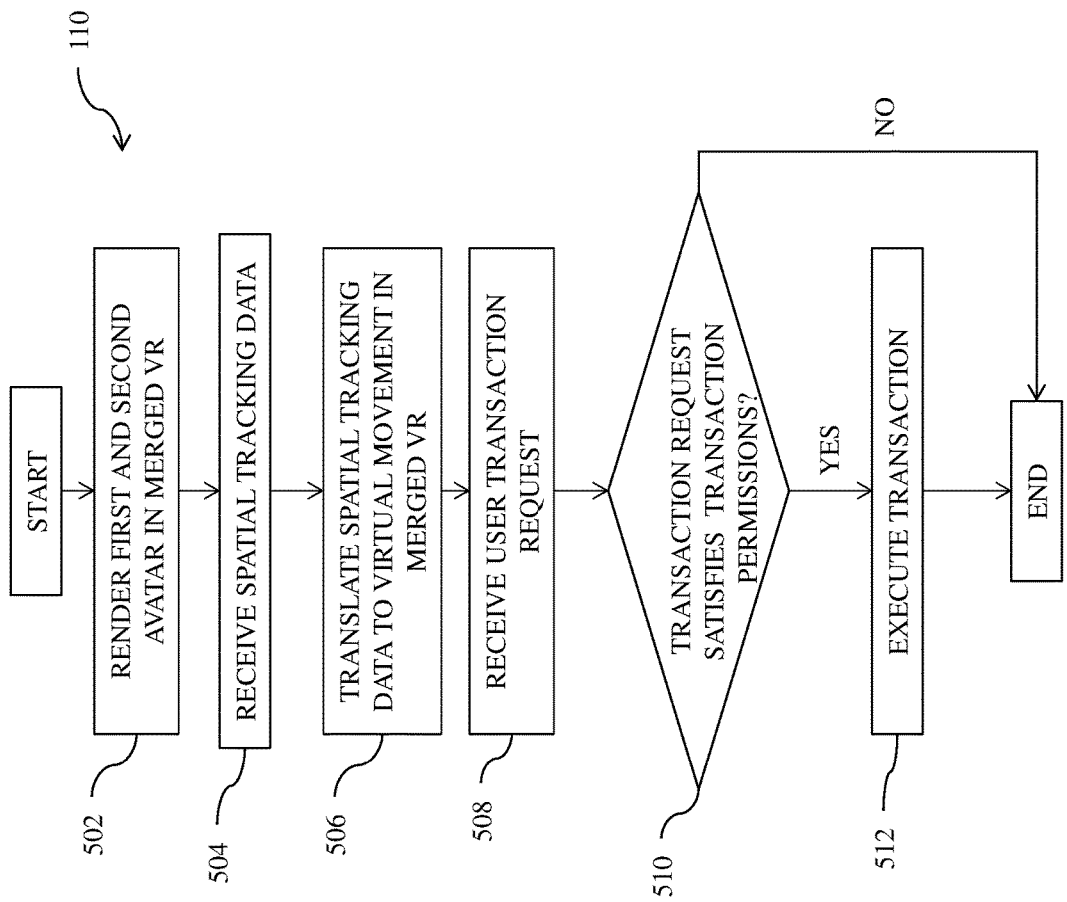
FIG. 5 is a schematic of a method of integrating interactive elements and executing user transactions associated in a virtual space occupied by multiple avatars.

FIG. 5 is a schematic of a method of integrating interactive elements and executing user transactions associated in a virtual space occupied by multiple avatars.

Environment engine 110 renders a first and second avatar in a merged volumetric representation (step 502).

It is contemplated that the first and second avatar can be rendered any number of additional avatars. However, it is further contemplated that environment engine 110 can limit the number of interactive elements and avatars rendered in a merged volumetric representation based on the practical limitations of the space. For example, if a retail space is packed to the limit with real people in the real-world environment, then the avatars of the real people within the space can take priority and avatars attempting to portal into the volumetric representation of the real-world space can be prohibited from doing so.

It is further contemplated that compensation in any form can be offered to users to promote the building of a merged volumetric representation of the real-world environment. In one example, a company attempting to map the lesser traversed portions of India can offer a monetary incentive to encourage users to send spatial capture data using their mobile computing device, such as smart phones.

Environment engine 110 receives spatial tracking data (step 504).

Spatial tracking data can use any one or more sets of data from sensors to track the movement of an individual within the real-world space or the volumetric representation of the real-world space.

For example, spatial tracking data can receive global positioning coordinates, accelerometer data, optical sensor data, and wireless connection data to confirm that the user is within a real-world space and to track the movement of the user within the real-world space.

In another example, spatial tracking data can receive coordinate data associated with the volumetric representation of the real-world space. Environment engine 110 can receive movement command data from a remote user's computer and allow the user to occupy an augmented reality space with an avatar.

When looked at from an augmented reality perspective by a real-world user within the real-world space, the avatar of the remote user moves about the real-world space in near real-time.

Spatial tracking data allows environment engine 110 to merge the real-world and the virtual world by allowing real-world users to peer into a virtual enhanced environment and allowing virtual users to conduct real-world interactions via a volumetric representation and any associated functionalities.

Environment engine 110 translates spatial tracking data to virtual movement in the merged volumetric movement (step 506).

As discussed in step 504, the translated spatial tracking data allows a merging of the volumetric representation of the real-world space with the real-world space. Further, the translated spatial tracking data can allow any number of interactions between the real-world users and the avatars in the volumetric representation.

Environment engine 110 receives a user transaction request (step 508).

It is contemplated that the user transaction request is received via user interface 106. However, environment engine 110 can receive a user transaction request in any manner available in the art.

Environment engine 110 determines whether the user transaction request satisfies transaction parameters (decision block 510).

In one example, transaction parameters can be associated with user-to-user (i.e., avatar-to-avatar) transactions. When a user selects an interactive element to trigger an interaction with another user, environment engine 110 can use the transaction parameters to manage the execution of the transaction (e.g., sales, trades, messages, picture sharing, video sharing, geolocation sharing, etc.). For example, environment engine 110 can receive transaction parameters requiring that a user attempting to trade an item, put the item in a digital escrow to prevent scam trades.

In one embodiment, the transaction parameters are associated with a sale. In another embodiment, the transaction parameters can be associated with an exchange. For example, environment engine 110 can receive rules governing the interactions between avatars, such as messaging, exchange of goods, and exchange of services. In a more specific related example, environment engine 110 can receive rules that require that both parties must directly message each other and select a confirmation button to confirm a trade to execute and exchange of a digital avatar skin.

In another embodiment, environment engine 110 can receive transaction parameters governing the interactions between a user avatar and an in-environment non-user character. For example, environment engine 110 can require that users confirm a spot in a queue to purchase an exclusive item in limited supply. In another example, environment engine 110 can require that users direct their avatars to talk to a virtual doorman to be let into an exclusive virtual walkabout reality.

However, it is contemplated that transaction parameters can include any variable associated with managing the interaction between two entities in any space comprising virtual elements.

Responsive to determining that the user transaction request satisfies the user transaction parameters ("YES" branch, decision block 510), environment engine 110 executes the transaction (step 512).

Responsive to determining that the user transaction request satisfies the user transaction parameters ("NO" branch, decision block 510), environment engine 110 ends.

Figure 6:
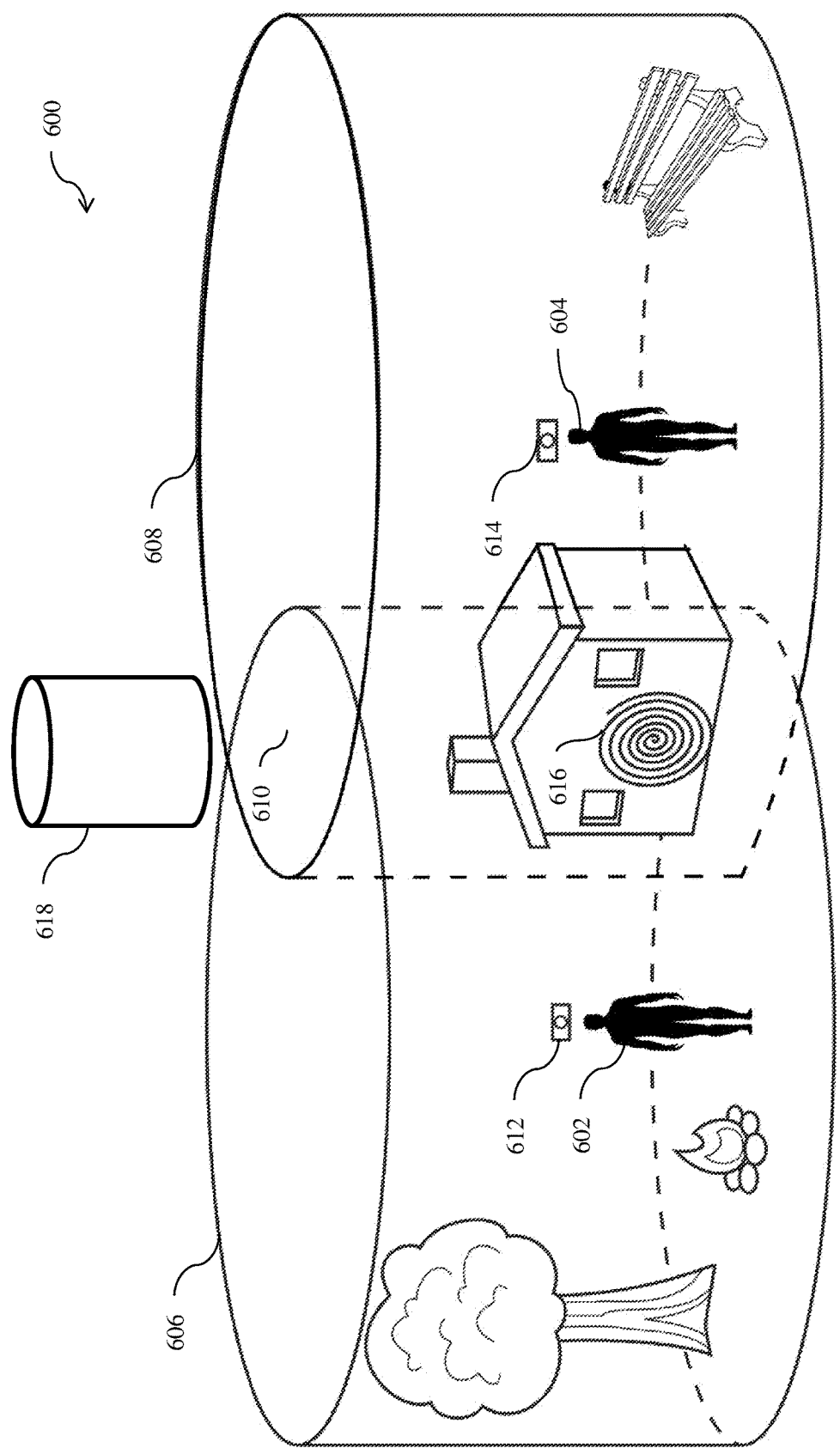
FIG. 6 depicts a merged virtual representation of the overlapping captured environments surrounding the two individuals.

FIG. 6 depicts a merged volumetric representation 600 of the overlapping captured environments surrounding the two individuals.

First environment 606 represents a pop-up space captured by user 602, and includes an outdoor region and a portion of a house. Second environment 608 represents a second pop-up space captured by user 604, and includes an adjacent outdoor region including a different portion of the house. Overlapping environment 610 is the overlapping spatial capture data between first user 602 and second user 604.

Environment engine 110 can populate the augmented reality environment associated with the merged volumetric representation to include any interactive element. For example, merged virtual representation 600 depicts the house having a portal 616 (shown as the vortex line drawing in overlapping environment 610), which can be associated with any secondary action/functionality. For example, a secondary functionality of the portal could be to allow approved users into an interior volumetric representation of the house.

In this example, first user 602 and second user 604 are utilizing 360° view cameras 612, 614. More generally it is contemplated that users could use any sensor or combination of sensors to provide multiple views of the subject's local environment. In another example, the sensor can include a single camera that is panned around the subject to create a cylindrical pop-up space.

In some embodiments, sensors include advanced range-sensing devices including, but not limited to, LIDAR, radar, and photogrammetry or other optical ranging technologies. For example, LIDAR can be used by a large concert venue to actively scan a live event and create a real-time volumetric scan for remote users to traverse with their avatars.

In FIG. 6, merged volumetric representation 600 is a traversable pop-up space including avatars of remote users and local users. For example, user 602 and user 604 can interact with avatars of remote users using an augmented reality function on their respective smartphones.

FIG. 6 also depicts a non-intersecting pop-up space 618 that can be seen in the distance by any one or more users, such as first and second users 602 and 604. It is contemplated that users can capture intermediate spatial capture data between first and second environments 606 and 608 and non-intersecting pop-up space 618. As such, users can fill in the gaps and connect non-intersection pop-up spaces to expand the continuously traversable space defined by merged volumetric representations.

Figure 7:
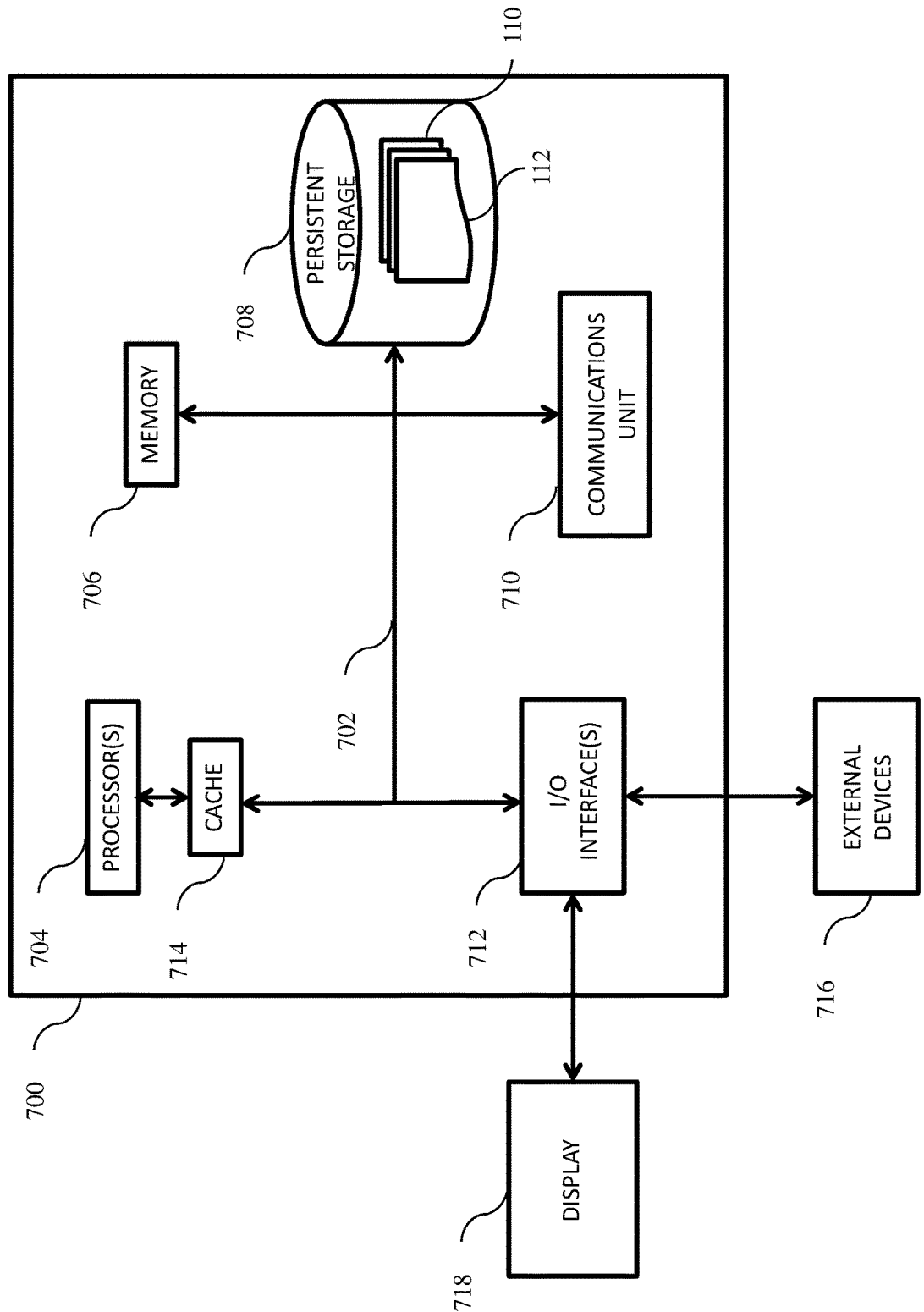
FIG. 7 depicts a block diagram of components of the server computer executing the environment engine within the distributed data processing environment of FIG. 1, in accordance with an embodiment of the present invention.

FIG. 7 depicts a block diagram of components of a server computer 108 executing environment engine 110 within the distributed data processing environment of FIG. 1.

Server computer 108 generally includes processor(s) 704, cache 714, memory 706, persistent storage 708, communications unit 710, input/output (I/O) interface(s) 712, and communications fabric 702.

Communications fabric 702 provides a communication medium between cache 714, memory 706, persistent storage 708, communications unit 710, and I/O interface 712. Communications fabric 702 can include any means of moving data and/or control information between computer processors, system memory, peripheral devices, and any other hardware components.

Memory 706 and persistent storage 708 are computer readable storage media. As depicted, memory 706 can include any volatile or non-volatile computer storage media. For example, volatile memory can include dynamic random-access memory and/or static random-access memory. In another example, non-volatile memory can include hard disk drives, solid state drives, semiconductor storage devices, a read-only memory (ROM), an erasable programmable read-only memory (EPROM), a flash memory, and any other storage medium that does not require a constant source of power to retain data.

In one embodiment, memory 706 and persistent storage 708 are random access memory and a hard drive hardwired to computing device 104, respectively. For example, computing device 104 can be a computer executing the program instructions of context engine 110 communicatively coupled to a solid-state drive and DRAM.

In some embodiments, persistent storage 708 is removable. For example, persistent storage 408 can be a thumb drive or a card with embedded integrated circuits.

Communications unit 710 provides a medium for communicating with other data processing systems or devices, including data resources used by computing device 104. For example, communications unit 710 can comprise multiple network interface cards. In another example, communications unit 710 can comprise physical and/or wireless communication links.

It is contemplated that environment engine 110, database 112, and any other programs can be downloaded to persistent storage 708 using communications unit 710.

In preferred embodiment, it's important to provide real-time location, which at least currently can advantageously be provided by GPS, which can track real-time location data of one or more users. Communications unit 710 comprises a global positioning satellite (GPS) device, a cellular data network communications device, and short to intermediate distance communications device (e.g., Bluetooth®, near-field communications, etc.). It is contemplated that communications unit 710 allows computing device 704 to communicate with other computing devices 104 associated with other users.

Display 718 is contemplated to provide a mechanism to display information from context engine 110 through computing device 104. In preferred embodiments, display 718 can have additional functionalities. For example, display 718 can be a pressure-based touch screen or a capacitive touch screen.

In yet other embodiments, display 718 can be any combination of sensory output devices, such as, for example, a speaker that communicates information to a user and/or a vibration/haptic feedback mechanism. For example, display 718 can be a combination of a touchscreen in the dashboard of a car, a voice command-based communication system, and a vibrating bracelet worn by a user to communicate information through a series of vibrations.

It is contemplated that display 718 does not need to be physically hardwired components and can, instead, be a collection of different devices that cooperatively communicate information to a user.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of creating a virtual pop-up space, the method comprising:
    receiving, from a first user, a first set of spatial capture data representing a first area of a real-world location located about the first user;
    rendering a first traversable 3D representation of the first real-world location based on the first set of spatial capture data,
        wherein the first set of spatial capture data includes a representation of a physical dimension and a physical location of a first object, and
        wherein the first object is at least partially within the first traversable 3D representation of the first real-world location;
    rendering a virtual interface configured to manage a user transaction within the traversable 3D representation;
    receiving, from a second user, a second set of spatial capture data representing a second area of a second real-world location located about the second user, wherein the second area falls within a distance threshold of the first area;
    rendering a second traversable representation of the second real-world location based on the second set of spatial capture data,
        wherein the second set of spatial capture data includes a representation of a physical dimension and a physical location of a second object, and
        wherein the first object is at least partially within the first traversable 3D representation of the first real-world location;
    determining whether the first area and the second area intersect; and responsive to determining that the first area and the second area intersect, stitching the first and second traversable 3D representations together into a shared virtual space captured from a shared real-world location.

2. The method of claim 1, wherein the shared virtual space is updated in substantially real-time based on additional user input.

3. The method of claim 1, wherein rendering the first traversable 3D representation further comprises receiving a selection of a point in time.

4. The method of claim 3, wherein the point in time is in the past.

5. The method of claim 4, further comprising rendering first traversable 3D representation based on historical spatial capture data.

6. The method of claim 1, wherein the first traversable 3D representation comprises one or more interactive elements associated with at least one of a physical object, a physical service, a virtual object, and a virtual service.

7. A computer-implemented method for generating a virtual pop-up space, comprising:
   rendering a first traversable 3D representation of a first real-world location using a first set of spatial capture data,
      wherein the first traversable 3D representation includes a first avatar of a first user, and
      wherein the first set of spatial capture data includes a representation of a physical dimension and a physical location of a first object;
   rendering a second traversable 3D representation of a second real-world location using a second set of spatial capture data;
      wherein the second traversable 3D representation includes a second avatar of a second user, and
      wherein the second set of spatial capture data includes a representation of a physical dimension and a physical location of a second object;
   determining whether the first traversable 3D representation and the second traversable 3D representation fall within a threshold distance, wherein an upper limit of the threshold distance includes at least one shared point between two adjacent traversable 3D representations;
   responsive to determining that the first traversable 3D representation and the second traversable 3D representation fall within the threshold distance; merging the first traversable 3D representation and the second traversable 3D representation to render a shared traversable 3D representation that includes the first avatar and the second avatar; and
   rendering a virtual interface configured to enable a user transaction through at least one of the first avatar and the second avatar within the shared traversable 3D representation of the real-world location.

8. The method of claim 7, wherein the user transaction is a purchase selected from at least one of the group consisting of: a physical object, a virtual object, a physical service, and a virtual service.

9. The method of claim 7, wherein the physical object is present and sold in the real-world location.

10. The method of claim 7, wherein the physical service is present and offered in the real-world location.

11. The method of claim 7, wherein the virtual object is available for purchase through the virtual interface.

12. The method of claim 11, wherein the virtual object is only available for purchase when the first avatar is within a distance threshold of the traversable 3D representation.

13. The method of claim 7, wherein the virtual service is available for purchase through the virtual interface.

14. The method of claim 13, wherein the virtual service is only available for purchase when the first avatar is within a distance threshold of the traversable 3D representation.

15. The method of claim 7, wherein the virtual interface is configured to receive a media capture command from the first user associated with the first avatar within the traversable 3D representation.

16. The method of claim 7, further comprising a real person at the real-world location, wherein the virtual interface is configured to manage one or more transactions between the first user and the real person.

17. The method of claim 7, wherein the traversable 3D representation is configured to limit entrance of one or more avatars into the traversable 3D representation of the real-world location.

* * * * *